(12) United States Patent
Humer et al.

(10) Patent No.: US 8,137,240 B2
(45) Date of Patent: Mar. 20, 2012

(54) CLUTCH ENGAGEMENT PROCESS IN WHICH THE TARGET ANGLE IS CONTROLLED

(75) Inventors: Matthias Humer, Dortmund (DE); Heribert Werthes, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 460 days.

(21) Appl. No.: 12/311,532

(22) PCT Filed: Sep. 28, 2007

(86) PCT No.: PCT/EP2007/060307
§ 371 (c)(1),
(2), (4) Date: Apr. 2, 2009

(87) PCT Pub. No.: WO2008/043671
PCT Pub. Date: Apr. 17, 2008

(65) Prior Publication Data
US 2009/0325765 A1 Dec. 31, 2009

(30) Foreign Application Priority Data
Oct. 9, 2006 (EP) .................................. 06021138

(51) Int. Cl.
*B60W 10/06* (2006.01)
*B60W 10/10* (2006.01)
(52) U.S. Cl. .......................................... 477/107; 477/90
(58) Field of Classification Search ..................... 477/90, 477/91, 107, 110
See application file for complete search history.

(56) References Cited

U.S. PATENT DOCUMENTS

| | | | |
|---|---|---|---|
| 6,171,213 B1 * | 1/2001 | Kosik et al. ...................... | 477/86 |
| 7,395,735 B2 * | 7/2008 | Enstrom et al. .................. | 74/661 |
| 2003/0228954 A1 * | 12/2003 | Runde et al. .................... | 477/107 |
| 2004/0011040 A1 | 1/2004 | Kita et al. | |
| 2004/0055272 A1 | 3/2004 | Tanaka | |
| 2005/0183422 A1 | 8/2005 | Ohkura et al. | |
| 2006/0184304 A1 * | 8/2006 | Katou et al. .................... | 701/54 |

FOREIGN PATENT DOCUMENTS

| | | |
|---|---|---|
| JP | 10184317 A | 7/1998 |
| RU | 2250387 C2 | 4/2005 |
| RU | 2003126221 A | 5/2005 |

* cited by examiner

*Primary Examiner* — Ha D. Ho

(57) ABSTRACT

A method for engaging a drive shaft of a turbo engine with an output shaft by means of a clutch is provided. The turbo engine is run up to a rotational speed that is subsynchronous to the speed of the output shaft and is maintained at the steady speed before a signal is set or before starting the engagement process.

8 Claims, 20 Drawing Sheets

FIG 21
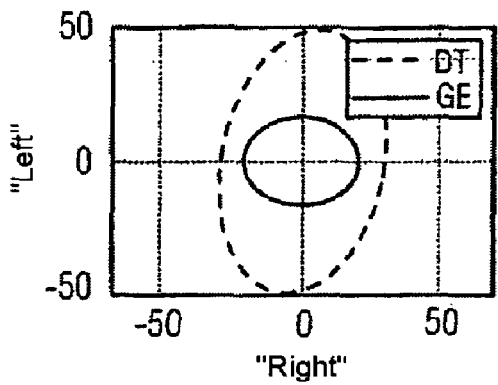
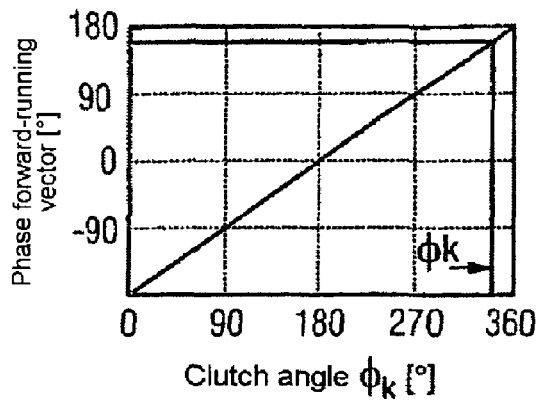
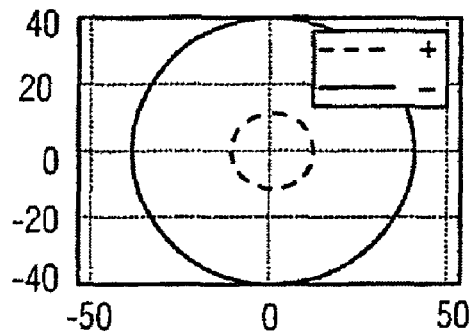
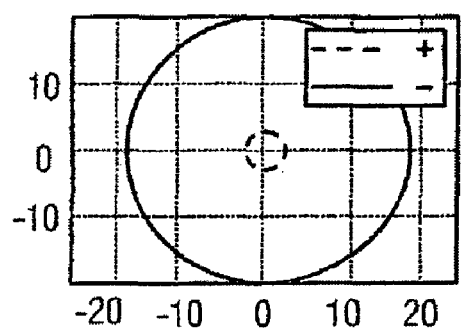
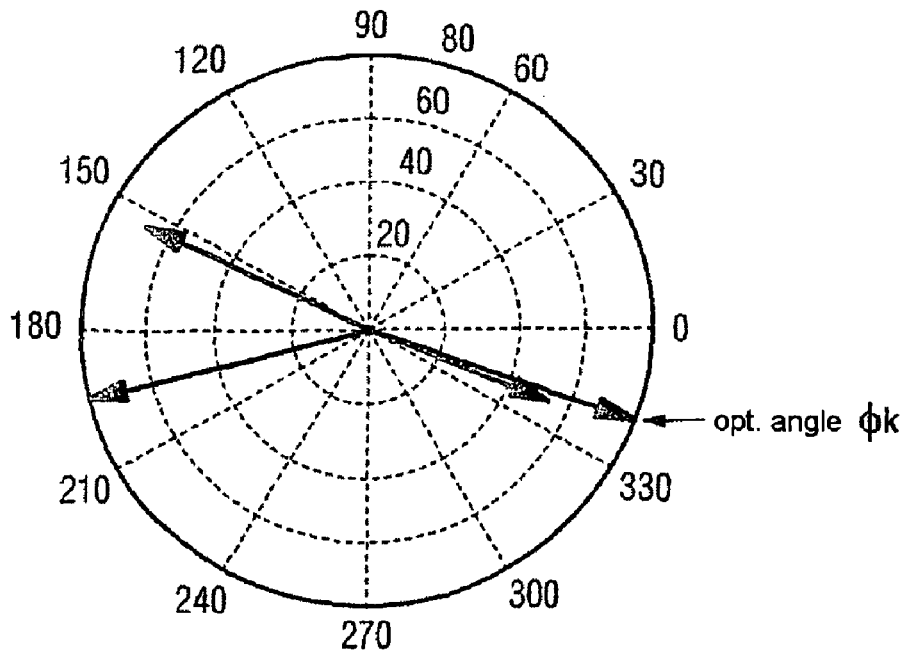

FIG 23
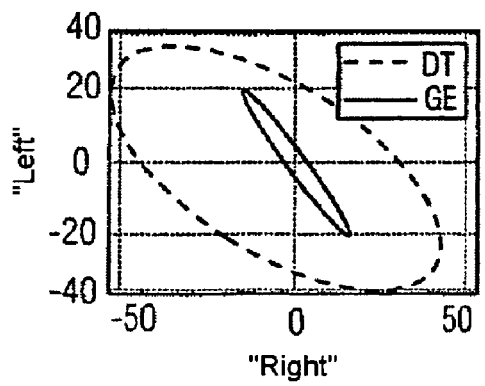
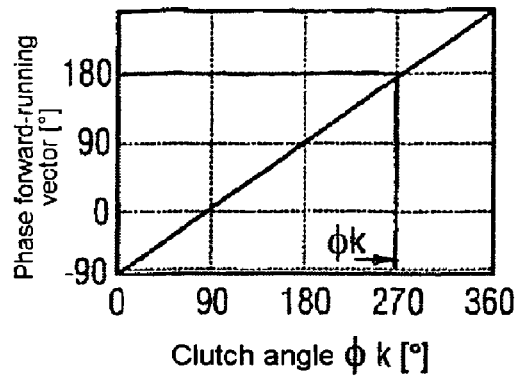
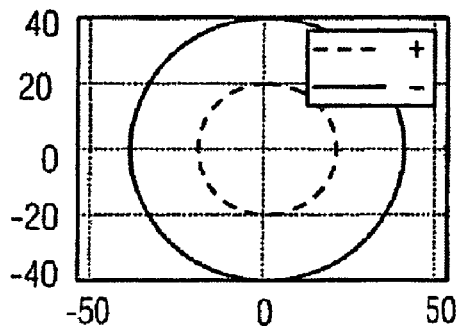
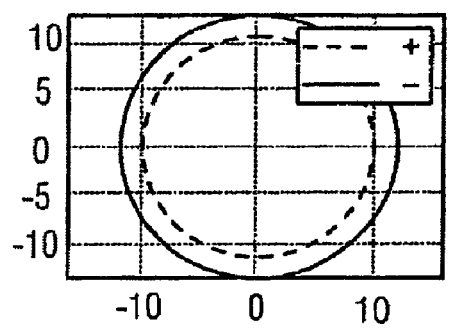
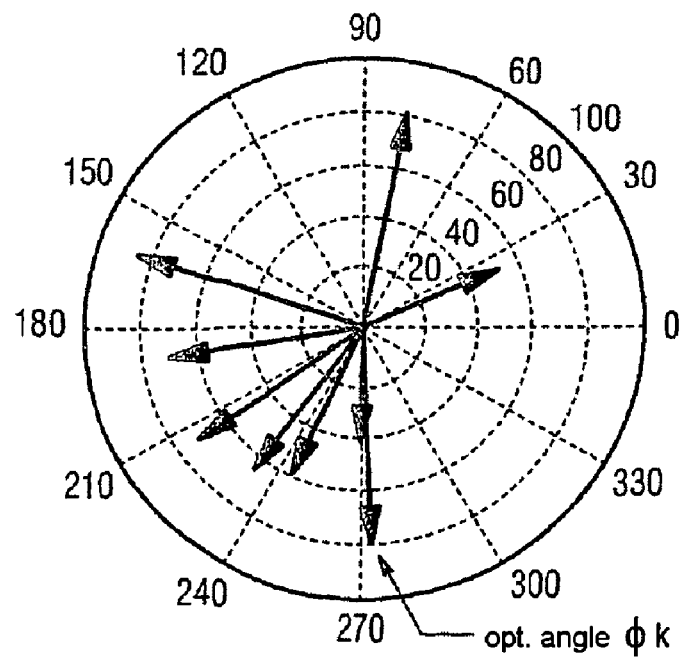

| GE / DT | Between critical | Supercritical |
|---|---|---|
| Between critical | 180° (Trial installation 1) | 0° |
| Supercritical | 0° (Trial installation 3) | 180° (Trial installation 2) |

CLUTCH ENGAGEMENT PROCESS IN WHICH THE TARGET ANGLE IS CONTROLLED

CROSS REFERENCE TO RELATED APPLICATIONS

This application is the US National Stage of International Application No. PCT/EP2007/060307, filed Sep. 28, 2007 and claims the benefit thereof. The International Application claims the benefits of European Patent Office application No. 06021138.0 EP filed Oct. 9, 2006, both of the applications are incorporated by reference herein in their entirety.

FIELD OF INVENTION

The invention relates to a method for clutch engagement of an input drive shaft of a continuous flow machine to an output drive shaft by means of a clutch.

BACKGROUND OF INVENTION

In gas and steam power stations, gas and steam turbines are available as types of drive. Gas and steam turbines are continuous flow machines. As a result of its short start-up time, a gas and steam power station can provide high power levels in a short time. The combination of gas turbines and steam turbines produces electrical power with good efficiency and high flexibility using various primary energy sources, and in terms of the operational characteristics of the entire turbine set.

The gas circuit and steam circuit are connected in one system, in order to increase the efficiency. The hot exhaust gas from the gas turbine is used to produce steam in a waste-heat boiler, and this produces mechanical torque in the steam turbine (three-pressure process). This combination increases the efficiency for the production of electrical power by about 36% to, for example, 57(%). One such installation is illustrated by way of example in FIG. 1 (outline sketch of a single-shaft gas and steam installation with an SSS clutch between the steam turbine and the synchronous generator). The example of a gas and steam single-shaft installation has a gas turbine 1, a generator 2, an exciter 3, a clutch 4 and a steam turbine 5.

In the case of the single-shaft installation considered by way of example in FIG. 1, the gas turbine and steam turbine are located with just one generator on a common shaft train. Approximately 10% of the investment costs can be saved by the lack of a second generator and its associated components.

In order to allow the advantages of the gas turbine to be exploited as well as possible, the steam turbine is first of all disconnected from the shaft train. At the operating temperature, the steam turbine can be engaged, virtually independently of the load state of the generator, via a clutch, for example via a synchronizing, self-selecting, over-running tooth-type clutch (SSS clutch).

The system comprising the gas turbine and generator in this case has a synchronous rotation speed. When the steam turbine exceeds this rotation speed, it is automatically engaged via a screw thread and can then transmit power to the electrical generator. The overall power of the turbine set is split such that approximately two thirds is provided by the gas turbine and one third by the steam turbine.

During steady-state, engaged power operation, the measured shafts and bearing oscillation are dependent on the relative angular position of the partial shaft trains with respect to one another, irrespective of whether these are machines which are operated at 50 Hz or 60 Hz. In this case, the maximum permissible limit values for bearing oscillation and shaft oscillation are exceeded at certain angular positions.

Measurements of the bending oscillations upstream and downstream of the clutch and of the associated clutch angle can be used as a basis for identification of good and bad positions.

SUMMARY OF INVENTION

Both the rotation-speed/power regulator of the gas turbine and the rotation-speed/opening regulator of the steam turbine have a PI structure. As can be seen in FIG. 2 (basic structure of the gas and steam turbine regulator) further regulators 7 are engaged via a central minimum-value selection 6. In FIG. 2, a power set value 8, an opening set value 9, a power actual value 10, an opening actual value 11, a rotation-speed set value 12 and a rotation-speed actual value 13 are supplied to the basic structure, with the signals 12 and 13 being supplied to a dead band 14. The basic structure produces a valve position actual value 15, taking account of a steady state k1, the influence of a frequency change k2 and the influence of a power set-value change k3.

FIG. 3 (overview of the gas and steam single-shaft installation) illustrates an overview of an example of a closed-loop control system for the single-shaft installation. The engagement process during rated operation of the gas turbine is governed only by the rotation-speed regulator of the steam turbine. Since the simulations carried out are therefore largely independent of the normal regulator variables, this document relates mainly to the steam-turbine rotation-speed regulators.

The rotation-speed/opening regulator has the task of regulating the amount of steam produced by the waste-heat boiler and flowing into the steam turbine, corresponding to the predetermined set values for the rotation speed and the opening. This is a two-variable regulator which sets the rotation speed and power of the turbine set for the following operating situations:

starting up the steam turbine
engaging with the shaft train of the gas turbine
loading of the turbine
load shedding and island operation
shutting down the turbine.

The output signals of the individual opening set values are linked to one another in the opening set-value formation process and actuate the associated position control systems. Each position control system positions the electrohydraulic drive (EHA), which in turn operates the associated actuating valve, via a servo valve.

Furthermore, there is an individual open-loop drive control system for each actuating valve or actuating flap (fresh steam, intercept steam and supply steam), via which the individual actuating valves or actuating flap can be limited.

The rotation-speed/power regulator of the gas turbine has been modeled in great detail with the primary frequency influence and the limit frequency influence, while the gas turbine has been modeled in a simplified form (see FIG. 4; gas turbine, V94.2A). Both the rotation-speed/opening regulator (FIG. 5; rotation-speed/opening regulator for the steam turbine) and the steam turbine itself (FIG. 6; gas and steam turbine) have been modeled very precisely in the modeling of the steam turbine.

During rotation-speed regulator operation, the steam turbine is accelerated to a rated rotation speed (equivalent to the actual rotation speed of the gas-turbine shaft train). When the steam-turbine rotation speed has exceeded the gas-turbine rotation speed, the two shaft trains are automatically engaged.

The regulator structure is in this case likewise automatically switched from rotation-speed regulator operation to opening-regulator operation.

The rotation-speed set value during start-up is illustrated in FIG. 7 (rotation-speed transient during start-up of the steam turbine). The steam turbine is accelerated, starting from steady-state warming-up operation at a few hundred rpm, with a transient of 0.167 Hz/s. As soon as the actual value has reached a specific slightly subsynchronous frequency, a flat transient of 0.05 Hz/s is predetermined as the set value for engagement. The standard value for this switching operation is $f_{sync}$-0.5 Hz (both for 50 Hz and 60 Hz power stations).

The signal KUPE (engage clutch) for further processing of the clutch state is generated from the relative speed of revolution of the two partial shaft trains. FIG. 7 shows the window for this signal from −0.083 Hz to +0.33 Hz, or −5 rpm to +20 rpm with respect to the rated rotation speed 16 of the gas turbine and of the output drive shaft.

Experience in operation has shown that a narrower window results in the signal KUPE no longer being stable, because of measurement inaccuracies. If no engagement takes place because the clutch is defective, the upper limit of the window prevents any further rise in the rotation speed. It is obvious that the signal KUPE, which is applicable to all the following operations, will have already been set before the steam turbine has reached a synchronous rotation speed. As already mentioned, however, the engagement process does not start until the synchronous generator rotation speed has been exceeded.

FIG. 8 (principle of an SSS clutch) shows the engagement principle. The switching collar C rotates at the same rotation speed as the steam turbine until the synchronous rotation speed is reached, at which it is held firmly on the switching part of the generator shaft F by the catch A. If the rotation speed is oversynchronous, the thread results in the collar being moved axially in the direction of the steam turbine. After only a short time, the teeth B engage, and the drive torque is transmitted via them. Furthermore, the SSS switching collar which is illustrated by way of example has a sleep thread D, an input drive side E (steam turbine) and a catch tooth system G. Furthermore, three smaller figures are shown on the right-hand side of the drawing in FIG. 8. The upper figure shows a disengaged state, the center figure shows an engagement movement, and the lower of the figures shows an engaged state.

FIG. 9 shows a simulation using the current control strategy (engagement process based on the control concept according to the prior art). The signal KUPE occurs considerably before the start of the engagement process and before tooth engagement. As a consequence of this, the rotation-speed regulator component of the steam turbine is immediately fixed at its current value, and the opening-regulator component is added at the same time, even though the steam turbine, which is still disengaged, is in rotation-speed operation.

The opening-regulator component follows a very flat transient of 10% per minute, which has only a minor influence on the following engagement process, in comparison to the influence of the rotation-speed regulator. FIG. 10 (engagement process with modified signal KUPE) shows this process after a change in the signal KUPE. KUPE is only set here when the rotation speeds of both partial shaft trains are the same. This change obviously has no major influence on the engagement process.

In the case of gas and steam single-shaft installations by way of example, two rotating partial shaft trains are engaged with one another as required at synchronous rotation speed. This results in shaft and bearing oscillations of different magnitude, as a result of which predetermined oscillation alarm values may possibly be exceeded, and these can lead to complex rebalancing measures or even to penalty demands of the operator to the supplier of the gas and steam installation.

The known rebalancing measures are intended to achieve a good oscillation behavior for the entire shaft train. However, in the past, the engagement process has been carried out without regulation and based on the random principle.

BRIEF DESCRIPTION OF THE DRAWINGS

The invention will be explained in more detail with reference to the following figures.

DETAILED DESCRIPTION OF INVENTION

The invention is therefore based on the object of providing a method of the type mentioned initially which ensures that engagement always takes place with the minimum oscillation value, with the aim of ensuring that the entire shaft train can be balanced and will remain balanced.

According to the invention, the object is achieved by a method having the features of the claims. Further advantageous refinements are disclosed in the dependent claims.

Overall, the method according to the invention provides a general measurement and control strategy for engagement of the steam turbine, which results in as little shaft and bearing oscillation as possible once all the transient processes have decayed.

At the same time, the invention provides the theoretical and control-engineering principles for a suitable automation appliance. This should use the oscillation response and the synchronization signals of the partial shaft trains before engagement to determine the advantageous clutch positions to be aimed for, at which the bending oscillation as far as possible assumes the minimum values.

The invention is based on the discovery that the closed-loop control system of the steam turbine can be appropriately modified in order to ensure both exact determination of the optimum engagement angle and exact engagement at the good position, in order to avoid unregulated and random engagement.

The single-shaft installation model including the generator and network, as used for the invention, was created using NETOMAC®, which also takes account of the torsion behavior of the clutch.

The behavior of the clutch in the engaged state (power operation) was primarily investigated in the prior art. In order to simulate the actual engagement process, the existing model had the "rotation-speed start-up" module added to it.

Figure 1:
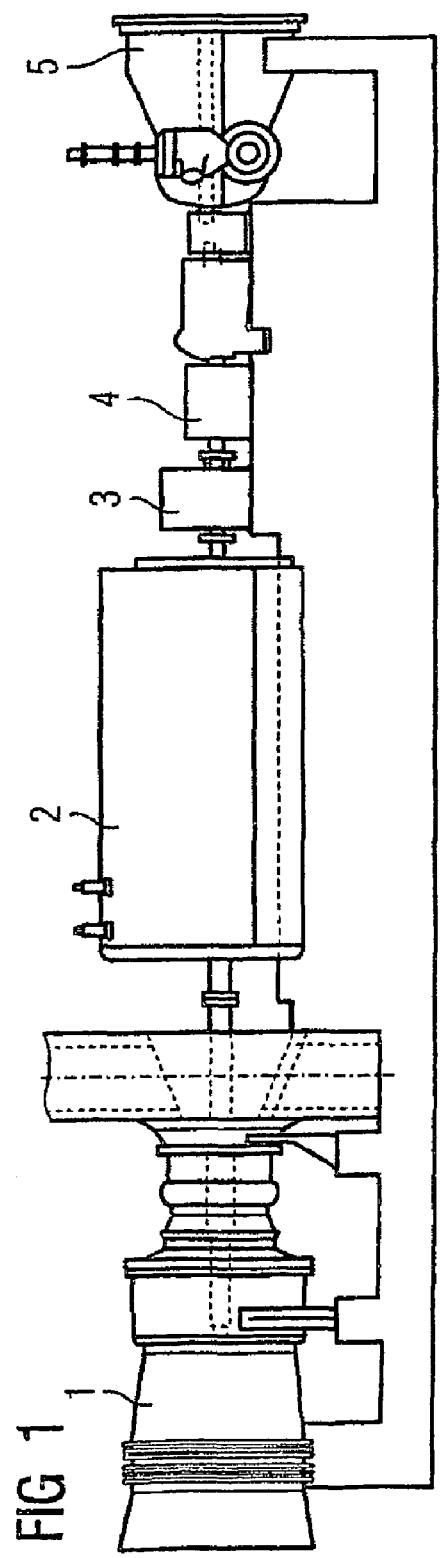
FIG. 1 Outline sketch of a single-shaft gas and steam installation with an SSS clutch between the steam turbine and synchronous generator, FIG. 2 Basic structure of the gas and steam turbine regulator, FIG. 3 Overview of the gas and steam single-shaft installation, FIG. 4 Gas turbine V94.2A, FIG. 5 Rotation-speed/opening regulator for the steam turbine, FIG. 6 Gas and steam turbine, FIG. 7 Rotation-speed transient during start-up of the steam turbine, FIG. 8 Principle of an SSS clutch, FIG. 9 Engagement process based on the control concept according to prior art, FIG. 10 Engagement process with modified signal KUPE, FIG. 11 Rotation-speed transient with acceleration and engagement with the target angle being controlled, FIG. 12 Engagement process with target angle, 0°, FIG. 13 Engagement process with target angle, 90°, FIG. 14 Engagement process with target angle, 180°, FIG. 15 Elementary model of the partial shaft trains of a Laval rotor, FIG. 16 Measurement of the shaft oscillations during the engagement process, trial installation 1, FIG. 17 Shaft center point and center of gravity move on a circular path, both partial and shaft rains rotate in the same sense and ω is less than $\omega_0$, FIG. 18 Subcritical on the left, supercritical on the right, with both partial shaft trains rotating in the same sense, FIG. 19 Shaft deflections separated on the basis of two spatial directions, FIG. 20 Possible profile of S and W between the critical angular frequencies, FIG. 21 Gas and Steam Trial Installation 2 including Orbits of the Partial Shaft Trains, Phase Difference of the Forward Running Vector, the Forward-Running Component and the Backward-Running Component of the Steam Turbine, the Forward-Running Component and the Backward-Running Component of the Generator, and the Clutch Chart, FIG. 22 Gas and Steam Trial Installation 3 including Orbits of the Partial Shaft Trains, Phase Difference of the Forward Running Vector, the Forward-Running Component and the Backward-Running Component of the Steam Turbine, the Forward-Running Component and the Backward-Running Component of the Generator, and the Clutch Chart, FIG. 23 Gas and Steam Trial Installation 1 including Orbits of the Partial Shaft Trains, Phase Difference of the Forward Running Vector, the Forward-Running Component and the Backward-Running Component of the Steam Turbine, the Forward-Running Component and the Backward-Running Component of the Generator, and the Clutch Chart, FIG. 24 Definition of the Designation of the Measurement Points, and FIG. 25 Phase Angle of the Forward-Running Vector with a Good Engagement Angle.
Figure 2:
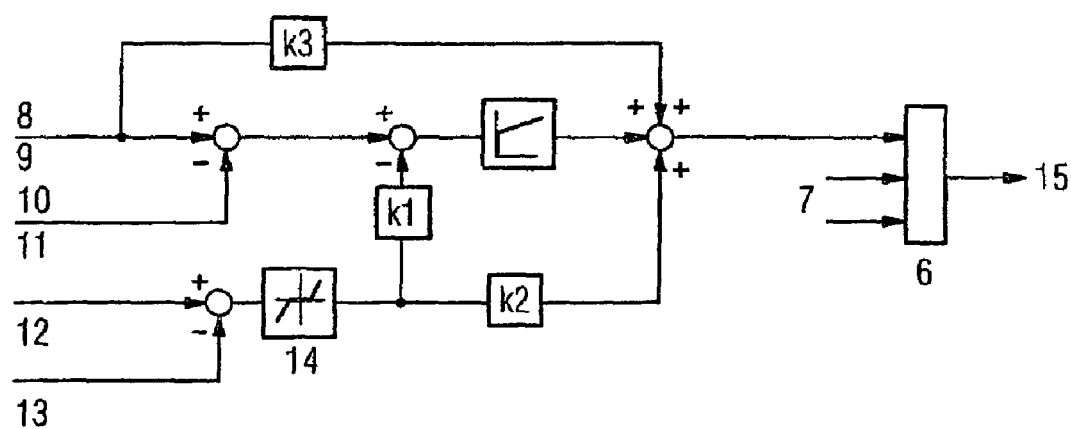
Figure 3:
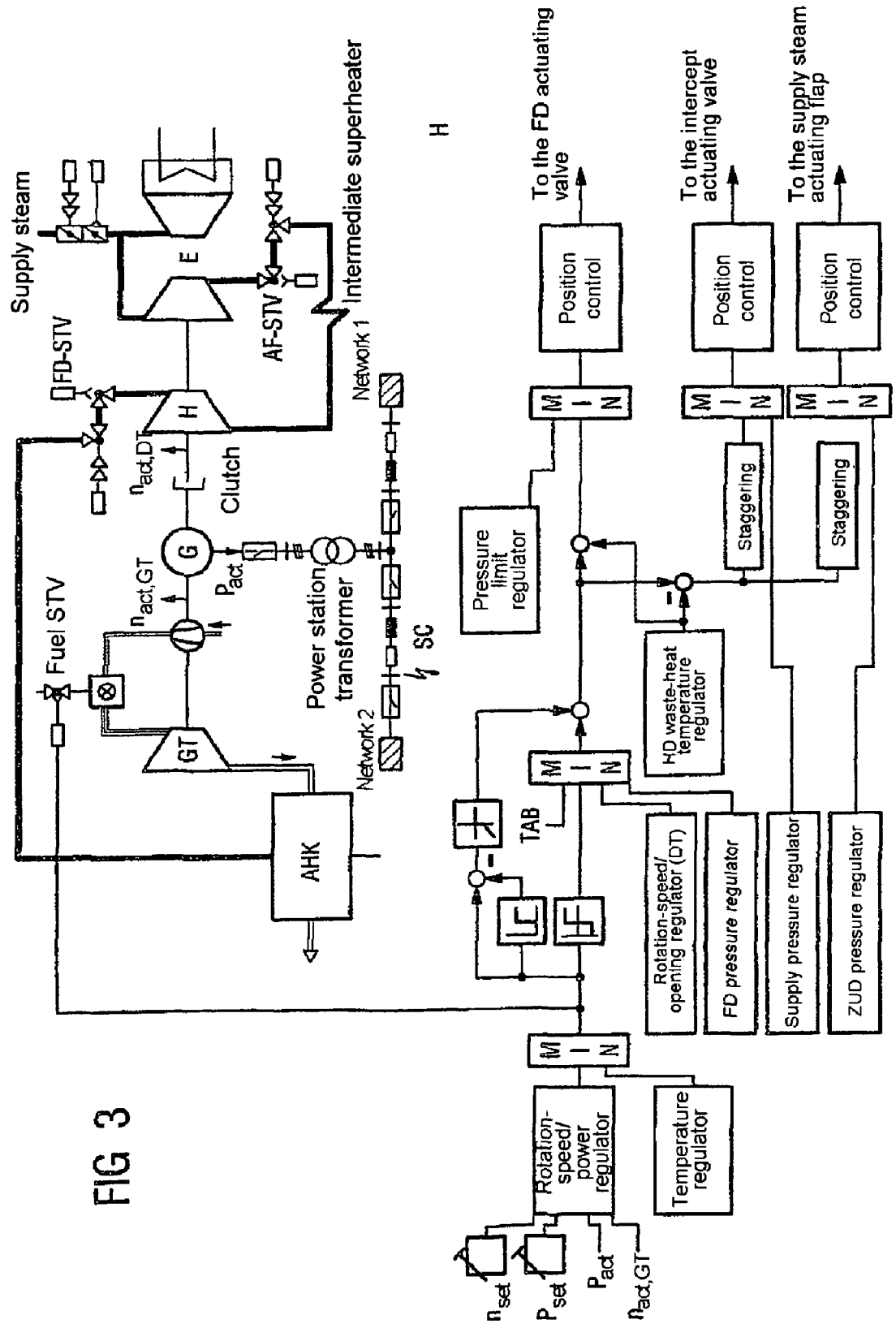
Figure 4:
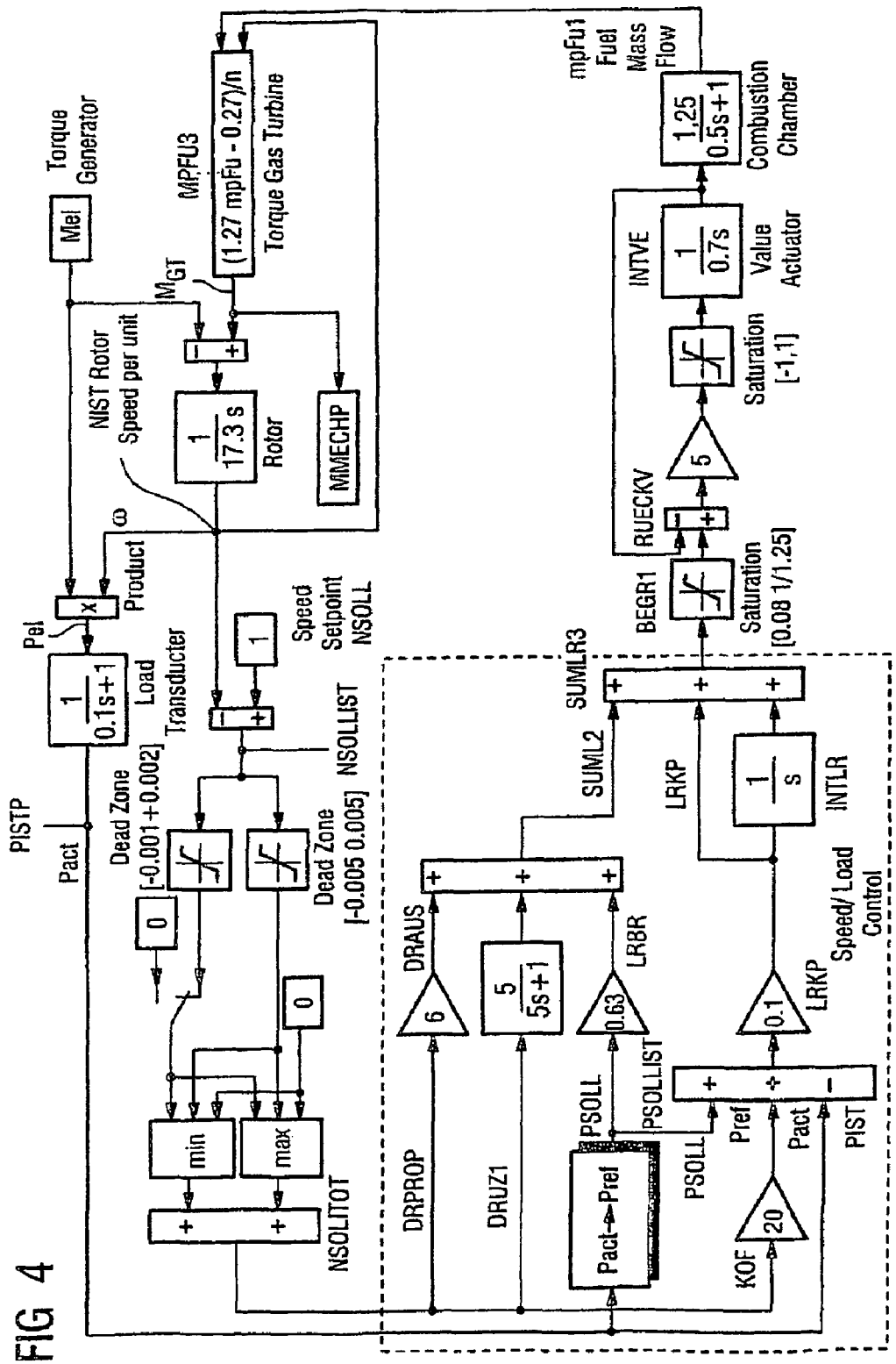
Figure 5:
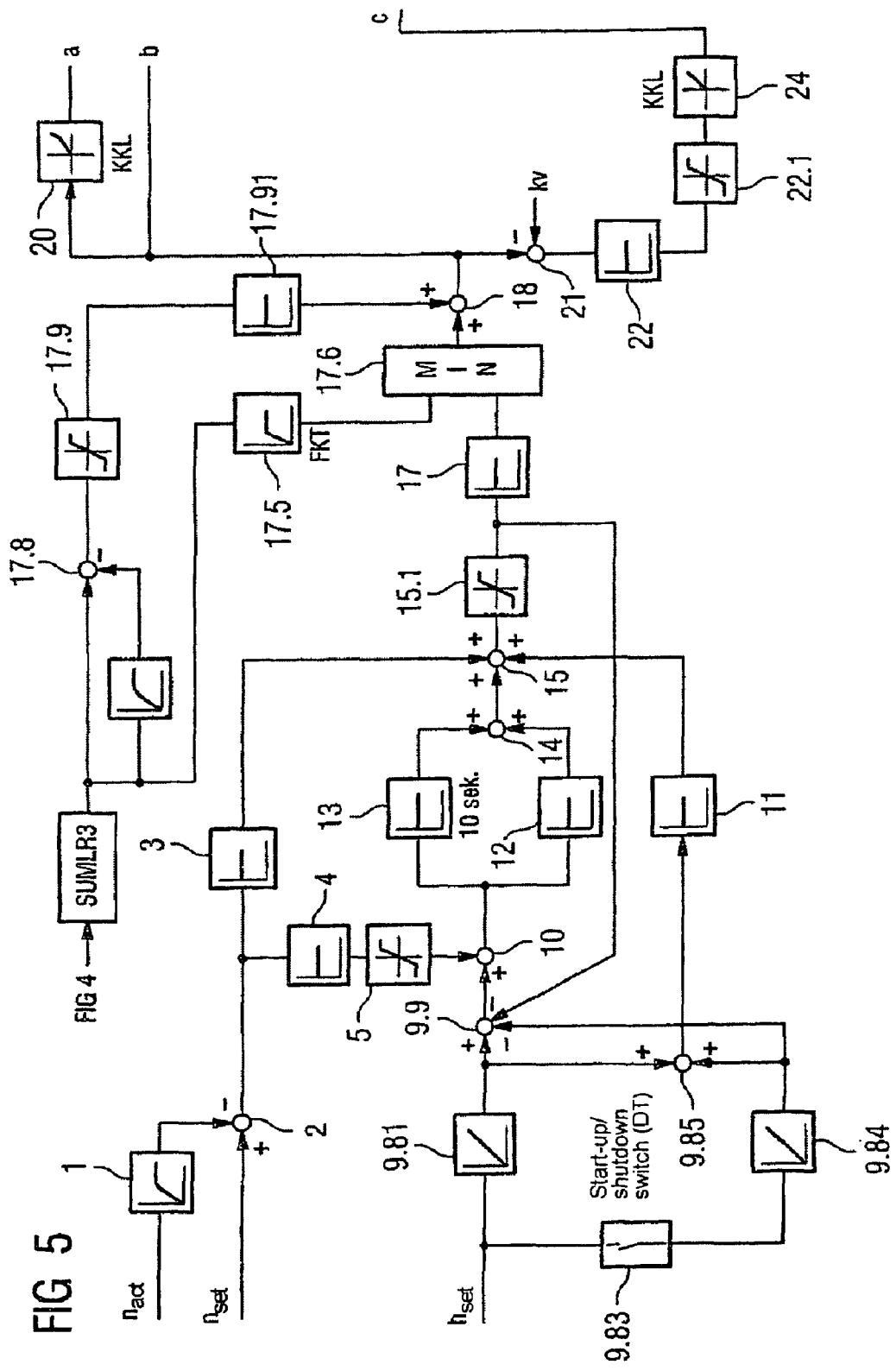
Figure 6:
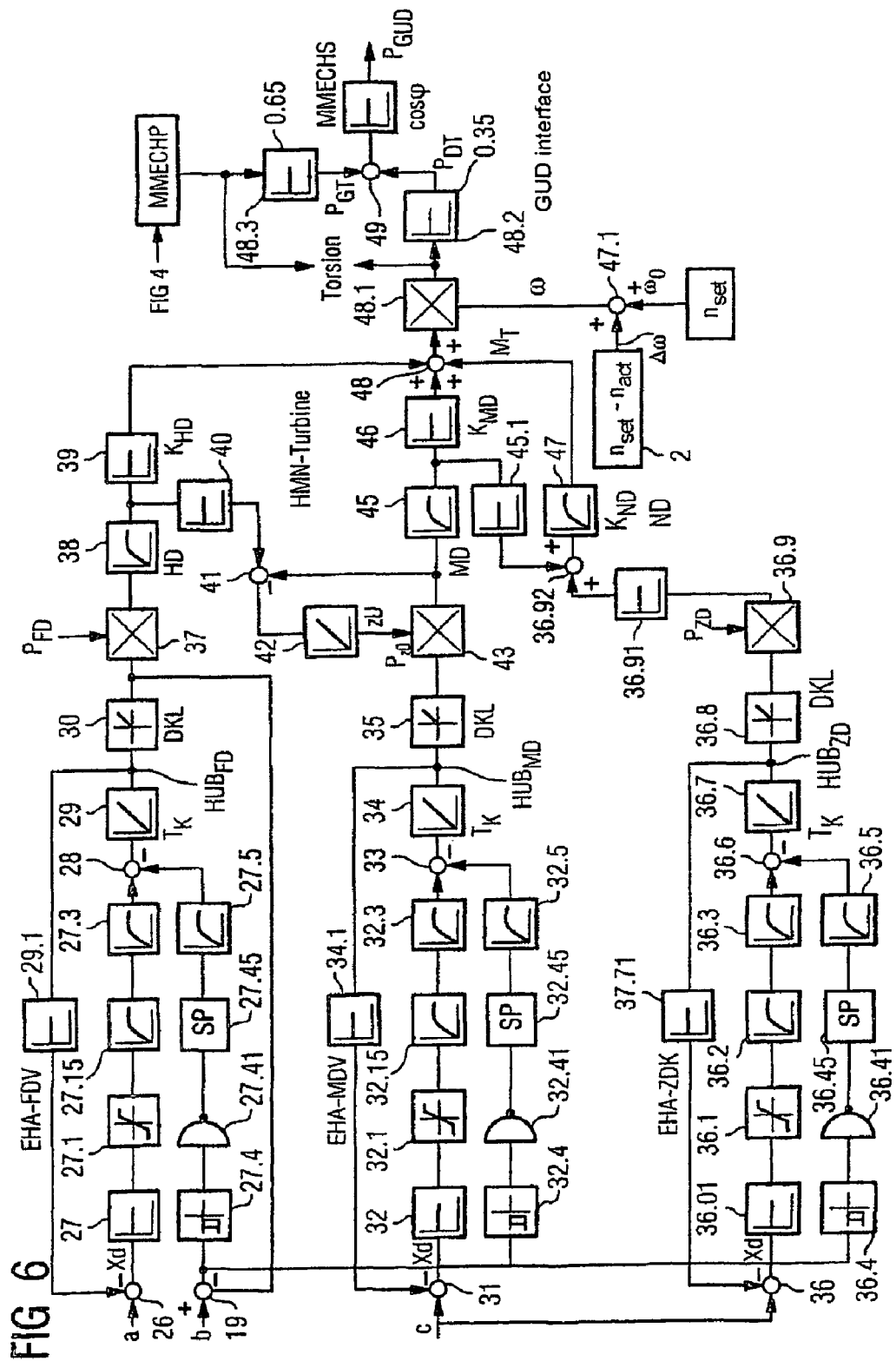
Figure 7:
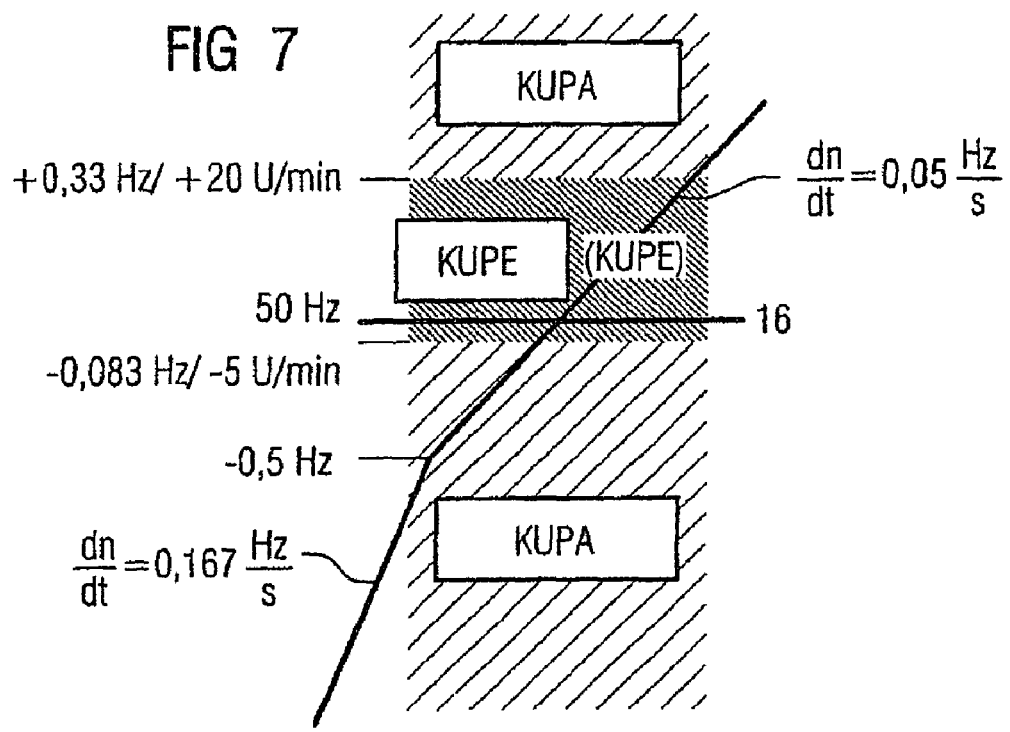
Figure 8:
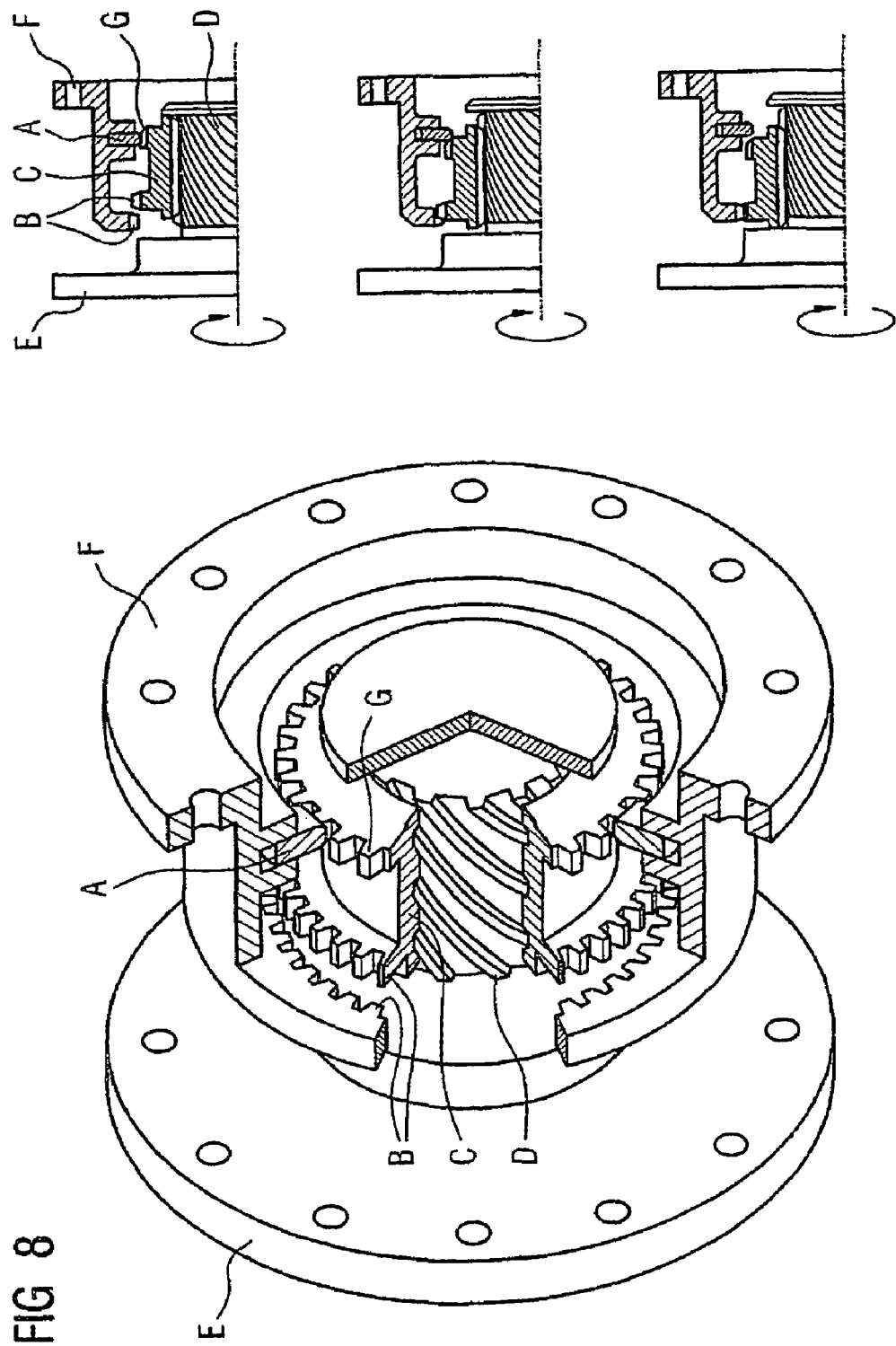
Figure 9:
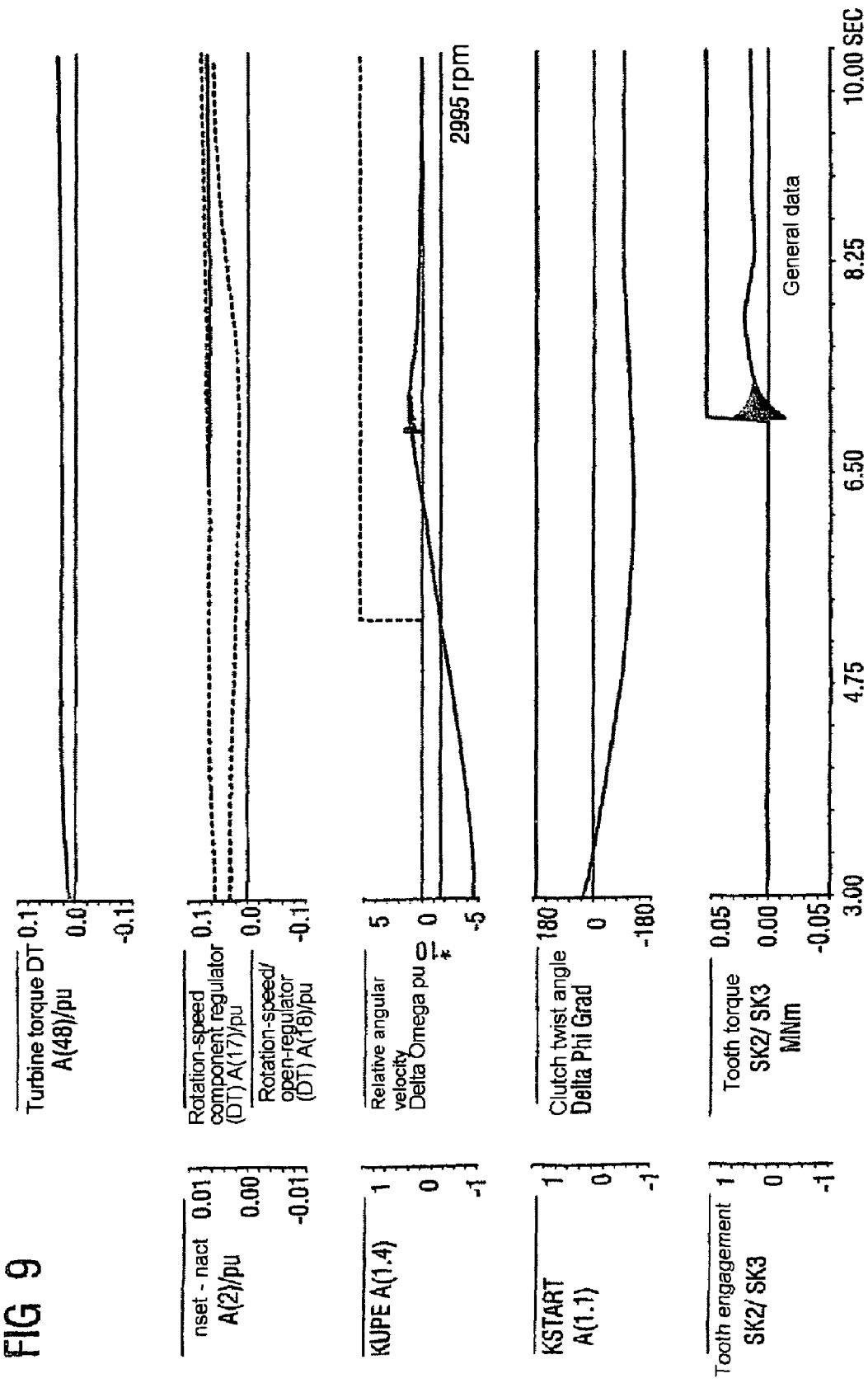
Figure 10:
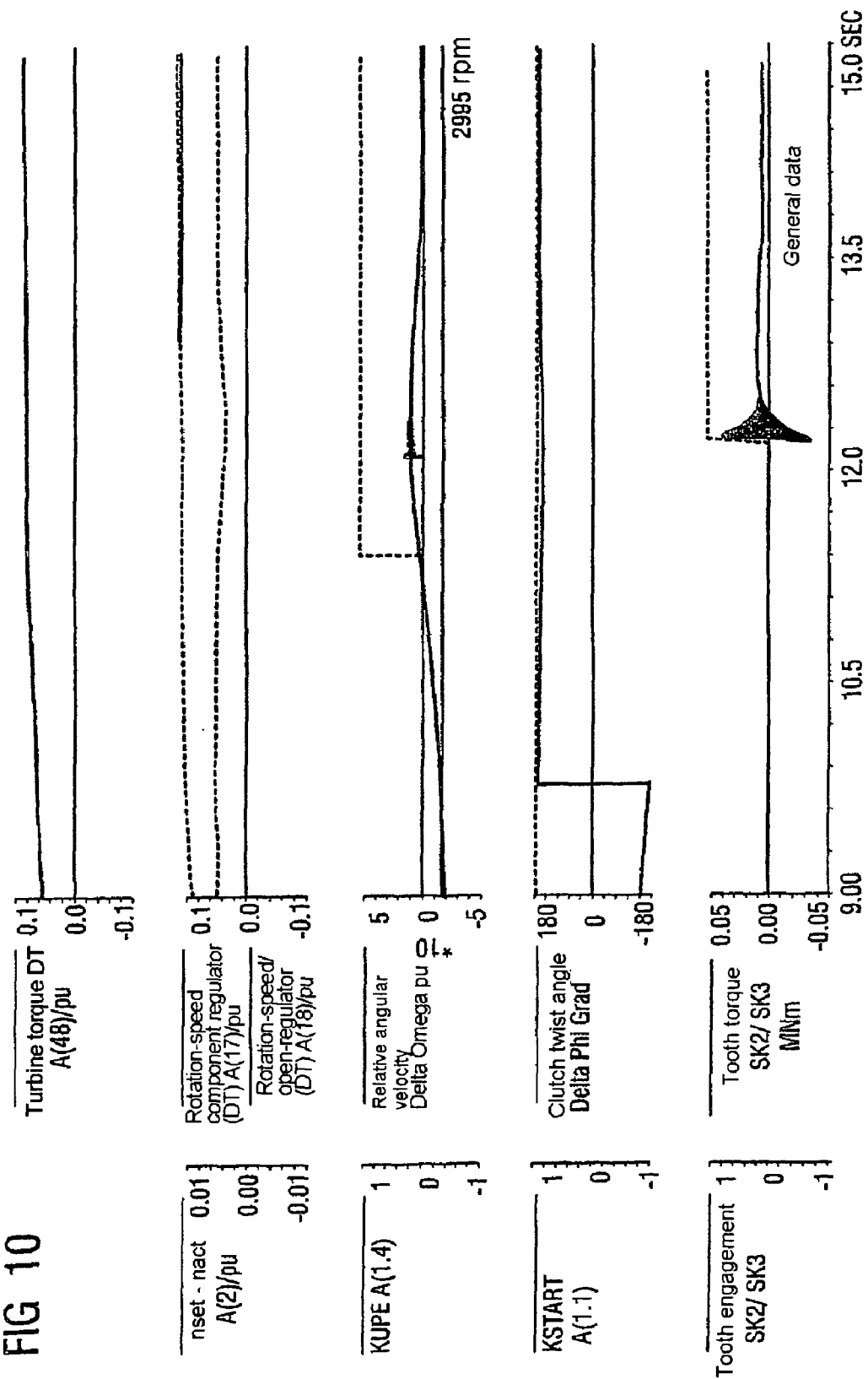

Although no significant change can be seen between FIG. 9 and FIG. 10, a shift in the signal KUPE from a rotation-speed difference of −5 rpm to 0 rpm is provided in a preferred manner in order to ensure clear separation between rotation-speed regulator operation and opening regulator operation. A signal KUPA (disengaged clutch) is in this case preferably set only when the difference −5 rpm is undershot again, in order to prevent errors caused by measurement inaccuracies.

The transient of the rotation-speed regulator before engagement of 0.05 Hz/s was originally derived from experience relating to the synchronization of the generator.

The stated value is advantageously further optimized in order to ensure smoother engagement. A flatter transient is provided in a preferred manner in this case, in order to avoid impermissible shocks during tooth engagement.

Engagement regulated both for determination of the good engagement angle and for the target angle is provided in a preferred manner, as already mentioned above, by modifying the current closed-loop control concept.

As described above, after reaching minimum operating temperature from the warming-up rotation speed with a fixed transient profile, the steam turbine is accelerated up to automatic engagement from the synchronous rotation speed.

In this case, the target angle $\phi_K$ or engagement angle $\phi_K$ for the end stop of the switching collar is purely random in the prior art.

In order to achieve a given angle, the steam turbine is advantageously accelerated to a slightly subsynchronous rotation speed (steady rotation speed) and is held there. The set value of the rotation speed can be predetermined according to FIG. 11 (rotation-speed transient with acceleration and engagement with the target angle being controlled). A steady rotation speed 17 is advantageously introduced. The steady rotation speed 17 is preferably and advantageously introduced at −10 rpm, which corresponds to approx. −0.167 Hz.

This rotation speed is maintained up to a start angle, which is dependent on the target angle (relative twist angle $\phi_K$, clutch angle $\phi_K$) which is reached between the input drive and the output drive. When the twist angle $\phi_K$ is equal to the predetermined start angle, this signal KSTART (start engagement) is set. From this time, engagement takes place with an undefined rotation-speed transient (preferably 0.05 Hz/s).

Figure 11:
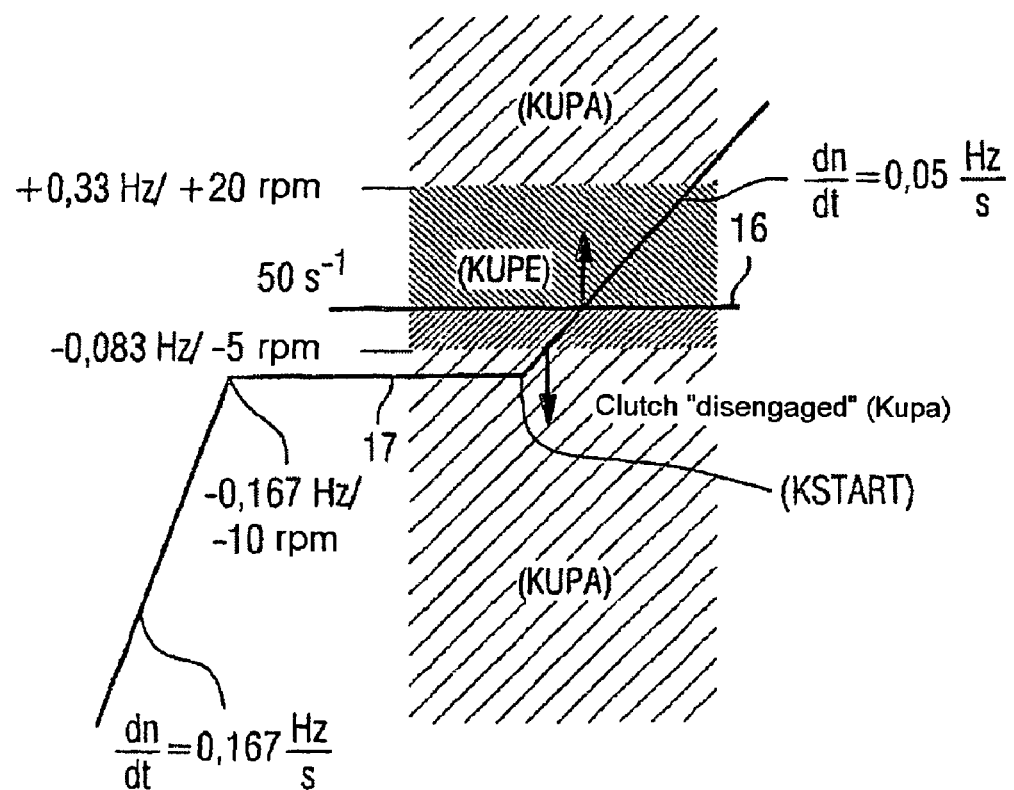

It should also be noted that the recommended change in the signal KUPE is illustrated in FIG. 11. All the following simulations are also subject to this change.

For a known target angle $\phi_K$, the angle $\Delta\phi$ to be exceeded can preferably be determined from the starting time to the end of the engagement process.

Calculation of this angle $\Delta\phi$ would require high-precision models of every individual installation including all the dynamic influences; this is therefore impracticable. The preferred option is to measure this angle $\Delta\phi$ when the gas turbine is being operated on load. It can be assumed that there is a constant $\Delta\phi$ for each gas and steam installation (installation-specific), which is the same for all possible target angles $\phi_K$. Simulations of the engagement process at different target angles have confirmed this.

Figure 12:
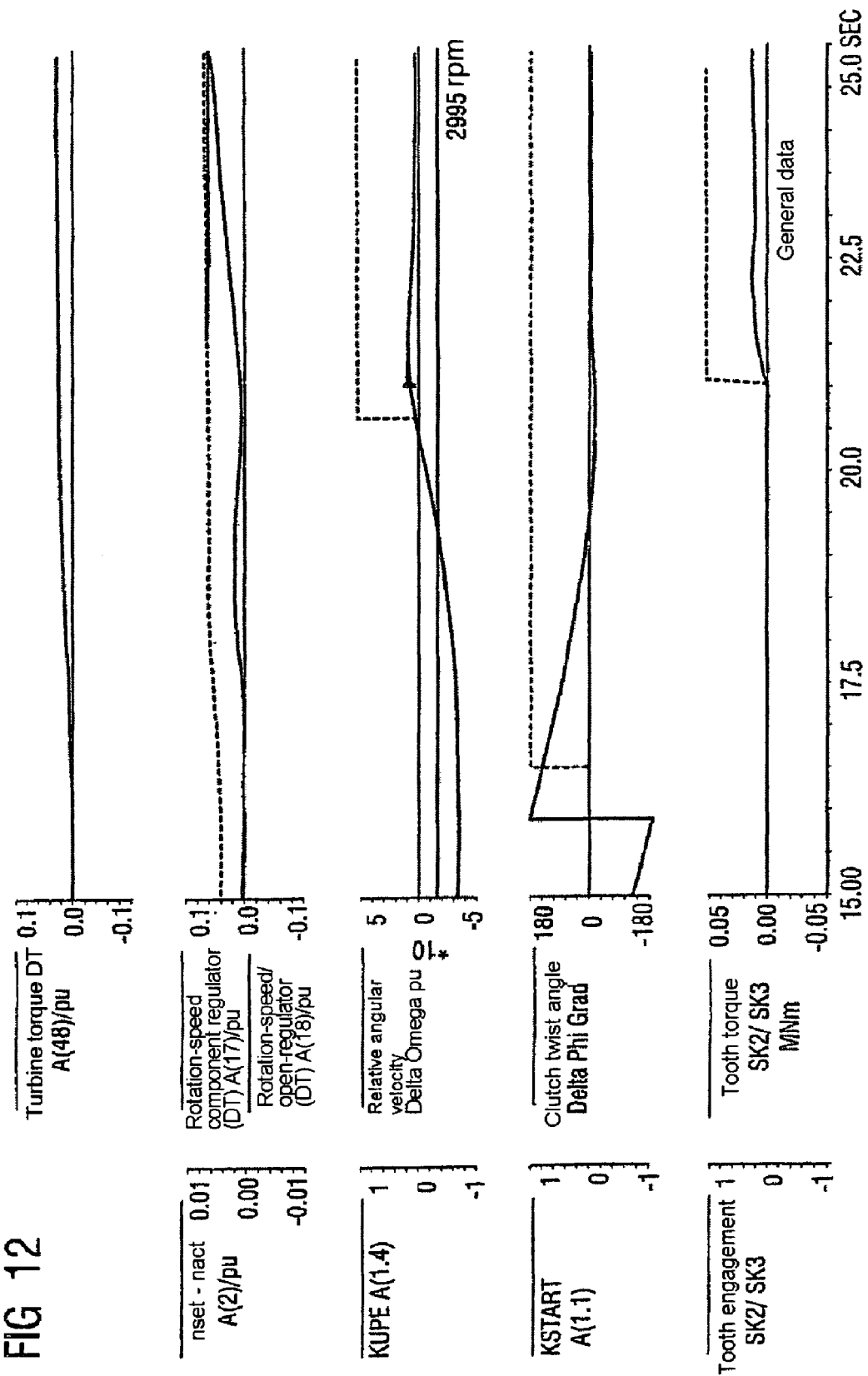
Figure 13:
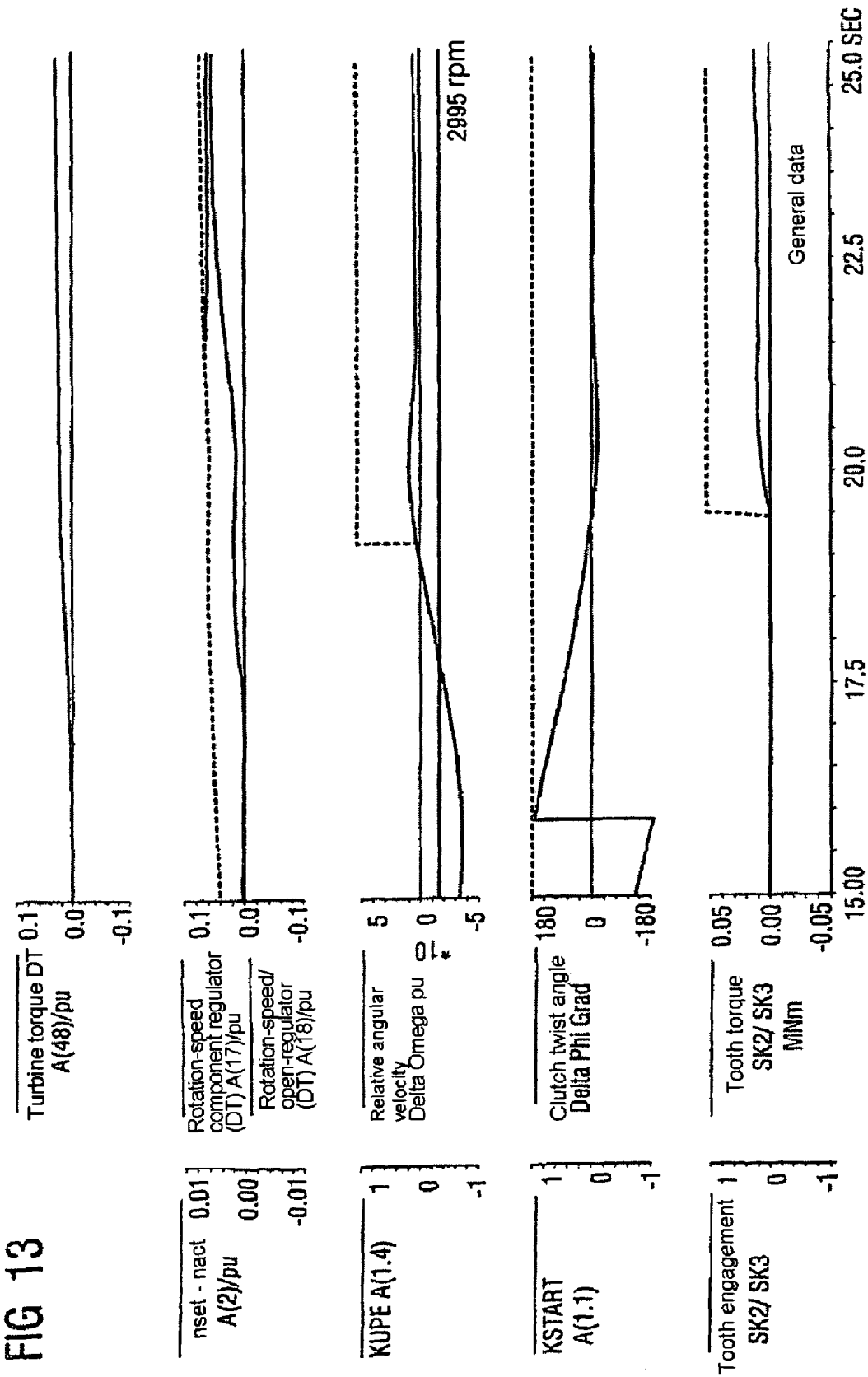
Figure 14:
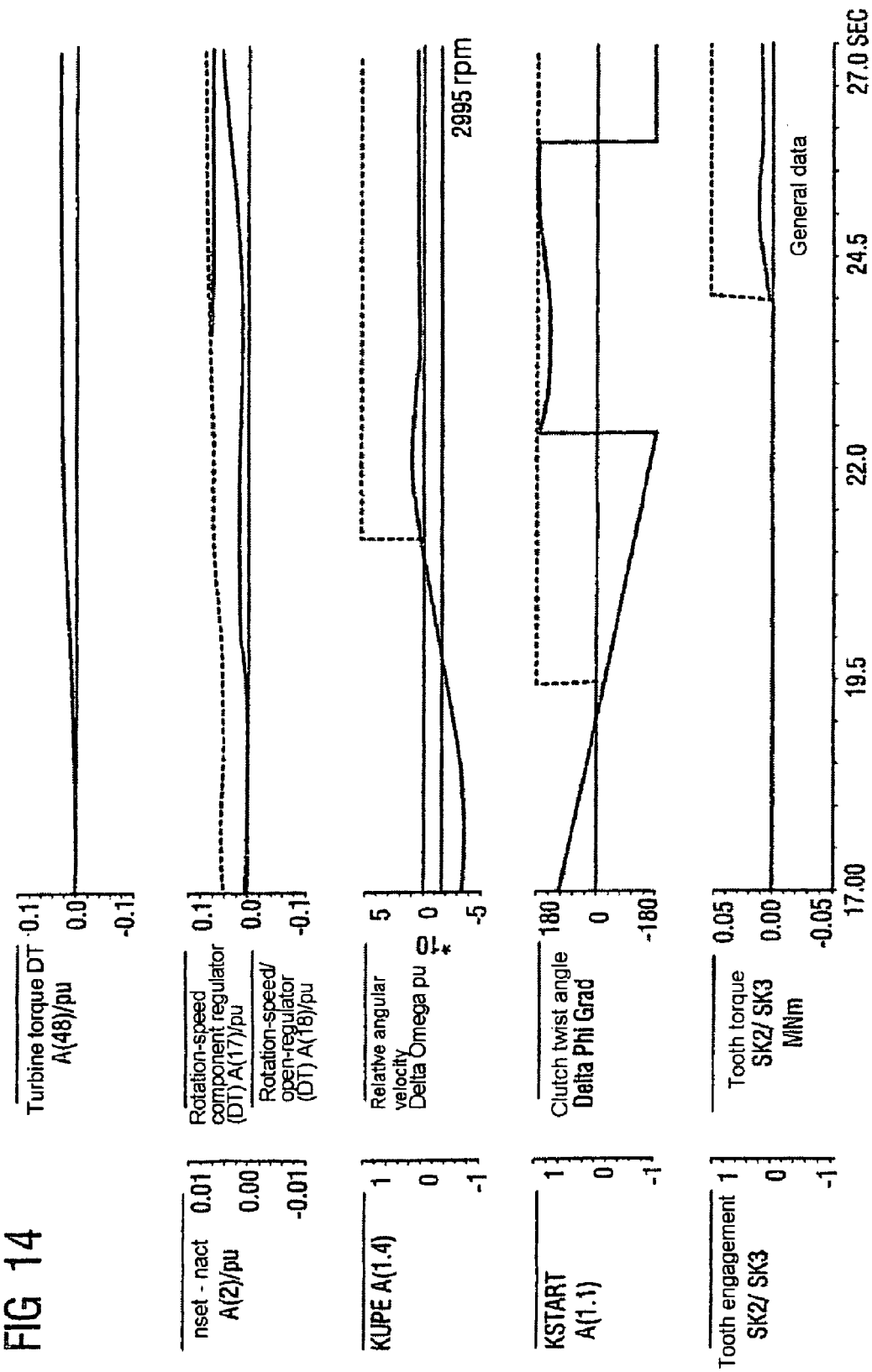

FIGS. 12, 13 and 14 (engagement process with target angle) show the simulation results for the target angle (relative twist angle $\phi_K$) 0° (FIG. 12), 90° (FIG. 13) and 180° (FIG. 14). The clutch model that is used results in a $\Delta\phi$ of approximately 145°. The start angle $\phi_0$ is thus calculated to be:

$$\omega_0 = \omega_K - \Delta\phi.$$

In all three cases, the predetermined target angle $\phi_K$ is reached. The torsion behavior which is taken into account in the model is obviously not critically dependent on the clutch angle or target angle at (relative twist angle) $\phi_K$.

The set-value profile of the rotation speed from FIG. 11 can additionally be used for determination of the optimum engagement angle (relative twist angle $\phi_K$).

If the signal KSTART is blocked, the steam turbine remains at the steady rotation speed of −10 rpm with respect to the generator. In this steady disengaged state of the two partial shaft trains, the shaft oscillations are then measured and compared, in order in this way to determine the optimum target angle.

If a clutch map exists, and a good clutch angle can therefore be identified, for existing installations, this can be preset as the target angle $\phi_K$. There is then no longer any need to determine a good angle.

A number of fundamental considerations relating to the bending oscillation behavior of a shaft will be introduced in order to arrive at a better understanding of the problems under consideration. This will be based on an elementary model of a Laval rotor as a substitute for the respective partial shaft train, whose behavior describes the fundamental processes.

The principles used in the following text originate from R. Gasch, Rotordynamik [Rotor dynamics], Springer Verlag, Berlin 1975, and are described in detail there. The formulae have been changed slightly in a preferred manner for matching to the ADRE measurement system in order to allow the given measurement data to be used directly later.

Figure 15:
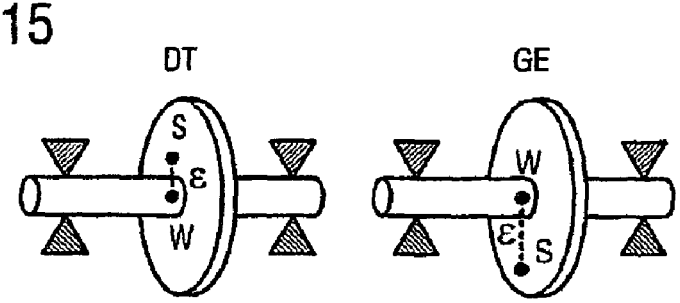

By way of example, the Laval rotor as in FIG. 15 (elementary model of the partial shaft trains of a Laval rotor) can be used as the simplest model of a shaft train. This is a disk, with mass, having a center of gravity S which has been displaced through the distance $\epsilon$ from the point W at which the shaft passes through, as part of a shaft without any mass in two rigid bearings. A Laval rotor such as this is in each case intended to represent the steam turbine (DT), as well as the gas turbine and the generator (GE).

From the mathematical point of view, it appears to be advantageous to describe the locus of S and W as a complex space vector. In this case, the real part corresponds to the Z coordinate and the imaginary part to the Y coordinate:

$$r_w = z_w + j \cdot y_w; \; r_s = z_s + j \cdot y_s \quad (1)$$

This representation offers the major advantage that it is possible to use complex calculation methods, which are used by preference for determination of a good engagement angle $\phi_K$ (target angle, relative twist angle).

Ignoring the damping, the weight force and the bearing stiffnesses, this results in the following movement equation for the point at which the shaft passes through:

$$\ddot{r}_w + \omega_0^2 \cdot r_w = \epsilon \cdot \omega^2 \cdot e^{j(\omega t - \omega 0)} \quad (2)$$

$\omega_0$ is the critical angular frequency which results from the mass and the spring stiffness of the shaft, and $\epsilon$ is the distance between S and W.

Figure 16:
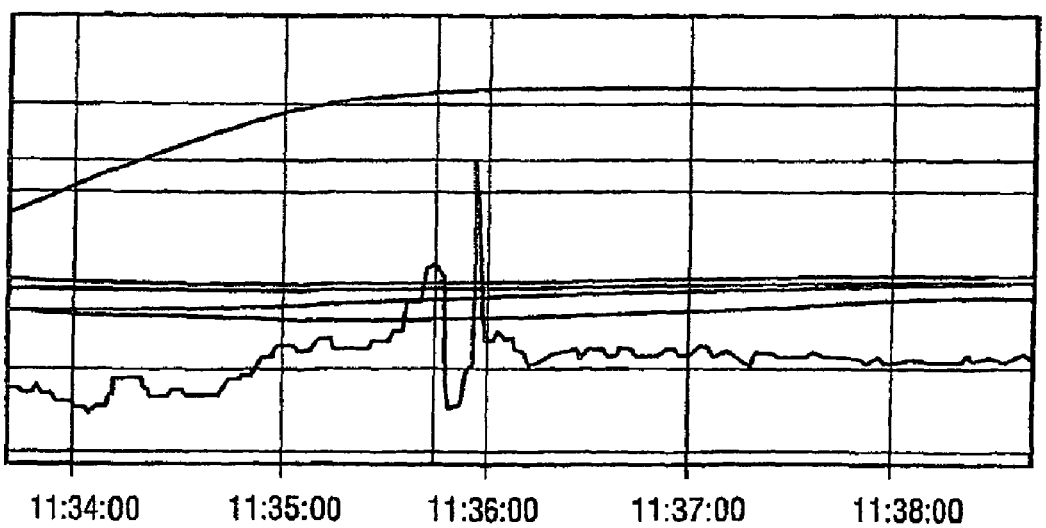

Since this is a linear differential equation, the solution comprises a homogeneous part, which depends on the initial conditions (for example shock on engagement) and a particular part forced by the input drive of the shaft. The two solutions are superimposed, which allows them to be considered individually. Taking account of the damping, the homogeneous solution of the differential equation decays after a short time. FIG. 16 (measurement of the shaft oscillations during the engagement process, trial installation 1) shows the measurement of the shaft oscillations of an engagement process during a first trial installation. In this case, a large peak can clearly be seen in the oscillation during engagement, which decays very quickly. After this, the oscillation amplitude reaches a steady-state value. The homogeneous solution of the equation of motion governs the peak value and will be ignored in the following text since only the steady-state shaft oscillations will be considered here.

In contrast, the particulate solution in each case provides the locus of S and W during steady-state operation, and thus the amplitude of the shaft oscillation after the transient processes have decayed:

$$r_{w_\varepsilon} = \varepsilon \cdot \frac{\left(\frac{\omega}{\omega_0}\right)^2}{1 - \left(\frac{\omega}{\omega_0}\right)^2} e^{j(\omega t + \varphi_0)}; \; r_{s_\varepsilon} = \varepsilon \cdot \frac{1}{1 - \left(\frac{\omega}{\omega_0}\right)^2} e^{j(\omega t + \varphi_0)} \quad (3)$$

The shaft center point and center of gravity move on a circular path (see FIG. 17; shaft center point and center of gravity move on a circular path, both partial shaft trains rotate in the same sense and $\omega$ is less than $\omega_0$) in the direction of the shaft rotation sense about the center of rotation M at the synchronous angular velocity $\omega$. In this case, the points M, W and S lie on a straight line.

On the basis of the assumptions that have been made, a critical angular frequency $\omega_0$ in each case exists as a function of the mass and spring stiffness of the shaft, at which the shaft oscillations are infinitely high. Below this angular frequency—subcritical operation—the center of gravity is outside the point at which the shaft passes through. When passing through the critical rotation speed, it makes a sudden phase change and, as the rotation speeds become higher—supercritical operation—it moves closer to the center point. This process is also referred to as self-centering of the shaft, since the amplitude of the shaft oscillation becomes less.

Figure 17:
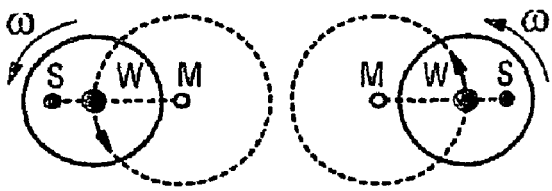

As can be seen from FIG. 17, two partial shaft trains should thus as far as possible be engaged with one another when the angle between the space vectors of the two shaft centers of gravity is actually 180°. In this case, the centers of gravity are each on opposite sides, and their effects at least partially cancel one another out. The new center of gravity of the engaged system is then closer to the point at which the shaft passes through.

Figure 18:
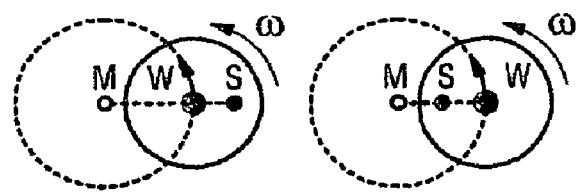

When both shaft trains are been operated at a supercritical rotation speed, both centers of gravity are internal. The angle between the space vectors must therefore also be equal to 180° in this case. If, in contrast, one shaft is running subcritically and one shaft supercritically, the angle should be 0° since, in this case, the centers of gravity are opposite, as can be seen in FIG. 18 (subcritical on the left, supercritical on the right, with both partial shaft trains rotating in the same sense).

Inter alia because of the effect of self-centering, the shafts are preferably operated supercritically, which means a simplification when finding a good engagement angle $\phi_K$ (target angle, relative twist angle).

When the damping is considered, the shaft oscillation at the critical angular frequency is limited to a value which is finite but is still not permissible. When moving through $\omega_0$, the center of gravity does not jump directly from the outside inwards but rotates more or less slowly inwards depending on the damping factor. Since no shaft is operated in the steady state in the vicinity of the critical angular frequency, and said transition of S takes place only in its vicinity, the statements made above are still valid.

Figure 19:
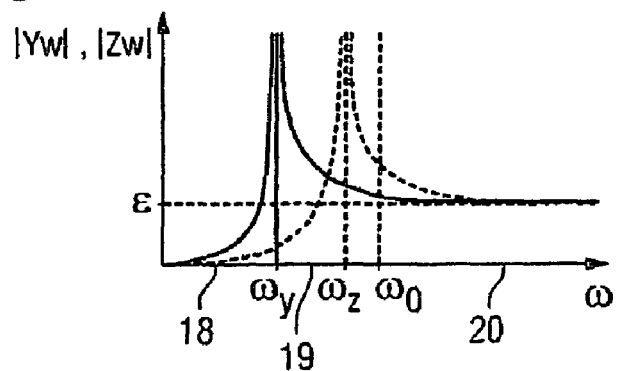

In the most general cases, the stiffness of the bearings can also be taken into account, as a result of which, in some circumstances, the critical angular frequency falls considerably. In particular, in this case, the anisotropy of the spring constant becomes less important with respect to the two spatial directions. $\omega_0$ depends on the spring constant and the mass, that is to say two critical angular frequencies $\omega_z$ and $\omega_y$ occur at different values of the constants, generally expressed in the horizontal and vertical directions. There is therefore a further between-critical range in which the shaft can be operated. FIG. 19 (shaft deflections separated on the basis of two spatial directions) shows the shaft deflections, which are of different magnitude depending on the angular frequency, separated on the basis of the spatial directions. The subcritical 18, between-critical 19 and supercritical 20 ranges are illustrated on the axis $\omega$.

In general it can be assumed that the bearings which are used in a turbine set are softer in the horizontal direction than in the vertical direction. In this case, it is therefore assumed that the horizontal y-critical always occurs before the z-critical on the angular-frequency axis. Both values are less than the critical angular frequency for rigid bearings.

Owing to the anisotropy of the bearing, the shaft center point moves on an elliptical path, which is referred to as an orbit. This orbit and therefore the shaft center point are each measured by means of two position sensors at different points on the shaft train and are available for determination of a good engagement angle $\phi_K$ (target angle, relative twist angle). The position (which cannot be measured directly) of the center of gravity with respect to the shaft center point in principle remains on the outside at subcritical angular frequencies, and on the inside at supercritical angular frequencies. At this point, each profile at between-critical values must also be considered.

Figure 20:
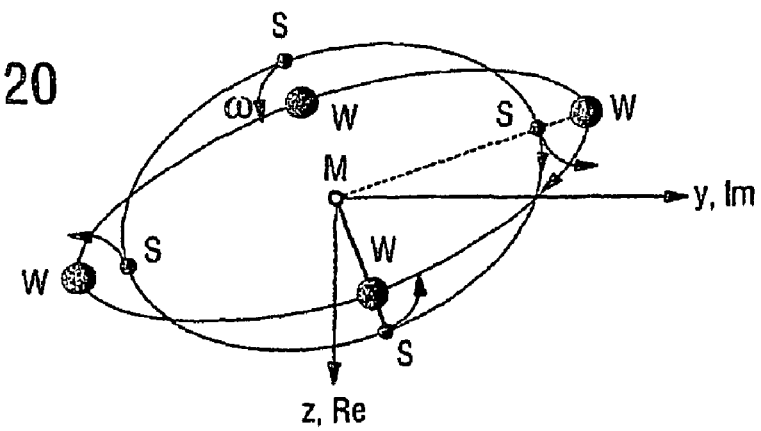

FIG. 20 (possible profile of S and W between the critical angular frequencies) shows the orbits of S and W between the two critical angular frequencies. These both rotate in opposite senses with respect to the shaft rotation. The center of gravity S still rotates with the shaft about W, however, and therefore changes its relative position during revolution. It is located on the outside with respect to the subcritical spatial direction, and on the inside with respect to the supercritical spatial direction.

If the intention is to engage two between-critical shafts with one another, the centers of gravity are precisely opposite one another when the phase difference between the vectors of the shaft center points is actually 180°.

The change in the phase of an elliptical orbit, in contrast to a circular movement, is not constant during revolution, which means that comparison of the phases of the two orbit vectors does not produce a usable result. A different approach must therefore be found for estimation of the instantaneous position of the centers of gravity as a function of the clutch angle, from the measurement data.

In the case of the coordinate system used here, the axes are shown on the horizontal and vertical, respectively, only for clarity reasons. The major half-axes of the orbit do not necessarily lie on the horizontal, either. The position of the coordinate systems is freely variable and can be aligned with the measurement points. However, the same coordinate system must be used for both partial shaft trains.

In order to implement the considerations described above, the complex-calculation methods must be applied to the available measurement data. These methods will now be derived on the basis of the formulae, and applied to measurement data from trial installations 1 to 3 (FIGS. 21 to 23), with trial installation 1 being illustrated in FIG. 23.

Two oscillation measurements are in each case taken for both partial shaft trains, preferably in the vicinity of the clutch or the SSS clutch. The preferred designation of the measurement points is defined in FIG. 24 (definition of the designation of the measurement points). In the case of the left-running shaft, the left sensor is located on the left-hand side, which corresponds to the imaginary part (Im), and the right sensor is located on the right-hand side, corresponding to the real part (Re).

One pulse signal is in each case determined per revolution for both partial shaft trains in order to determine the rotation speed, and the relative twist angle can be determined from the time difference between them. The difference in (4) is defined as the relative angle $j_K$:

$$\phi_K = \phi_{generator} - \phi_{steam\ turbine} \quad (4)$$

For evaluation, the rotation-frequent oscillation is filtered out for each of the four signals on the basis of the amplitude $\hat{A}$ and phase $\phi$ (with respect to the respective intrinsic rotation-speed signal). These signals are represented as complex space vectors. The signals are therefore in the following form:

$$r_{W,GE} = \hat{A}_{r,GE} \cdot \cos(\omega t - \phi_{r,GE}) + j \cdot \hat{A}_{l,GE} \cdot \sin(\phi t - \phi_{l,GE} + \pi/2)$$

$$r_{W,DT} \cdot \cos(\omega t - \phi_{r,DT} - \phi_k) + j \cdot \hat{A}_{l,DT} \cdot \sin(\omega t - \phi_{l,DT} - \phi_k + \pi/2) \quad (5)$$

The indices l and r represent the left-hand and right-hand sensor, respectively. In the following text, the formulae will be described only for the gas-turbine side since the indices just have to be interchanged and $\phi_K$ subtracted for the equation for the steam turbine.

The elliptical paths on which the points at which the shaft passes through move can be mathematically represented as the superimposition of two contrarotating circular movements at the same angular velocity but with a different radius.

The known Euler equations are applied to (5) for this purpose:

$$\cos x = \tfrac{1}{2}(e^{jx} + e^{-jx}) \text{ and } j \cdot \sin x = \tfrac{1}{2}(e^{jx} + e^{-jx}) \quad (6)$$

Substituting equation (6) in (5) for the shaft center point on the gas-turbine side results in:

$$r_{W,GE} = \hat{A}_{r,GE} \cdot \tfrac{1}{2}\left(e^{j(\omega t - \phi_{r,GE})} + e^{-j(\omega t - \phi_{r,GE})}\right) + \hat{A}_{l,GE} \cdot \tfrac{1}{2}\left(e^{j(\omega t - \phi_{l,GE} + \tfrac{\pi}{2})} - e^{-j(\omega t - \phi_{l,GE} + \tfrac{\pi}{2})}\right) \quad (7)$$

by bracketing out $e^{j\omega t}$ and $e^{-j\omega t}$ and separation on the basis of positive and negative exponents, results in the following equation:

$$r_{W,GE} = \underbrace{\tfrac{1}{2}\left(\hat{A}_{r,GE} \cdot e^{-j\phi_{r,GE}} + \hat{A}_{l,GE} \cdot e^{-j(\phi_{l,GE} - \tfrac{\pi}{2})}\right)}_{\hat{r}_+} e^{j\omega t} + \underbrace{\tfrac{1}{2}\left(\hat{A}_{r,GE} \cdot e^{-j\phi_{r,GE}} - \hat{A}_{l,GE} \cdot e^{-j(\phi_{l,GE} - \tfrac{\pi}{2})}\right)}_{\hat{r}_-} e^{-j\omega t} \quad (8)$$

In this case, $\hat{r}_+$ is the radius of a circular path which is referred to as the forward-running component of the orbit, and $\hat{r}_-$ is the radius of a circle which is referred to the backward-running component. In this case, the forward-running component and the backward-running component relate to the rotation sense of the shaft. The respective phase angle is contained in $\hat{r}_+$ and $\hat{r}_-$. A breakdown such as this has been carried out with the measurement data in FIGS. 21 to 23.

Figure 22:
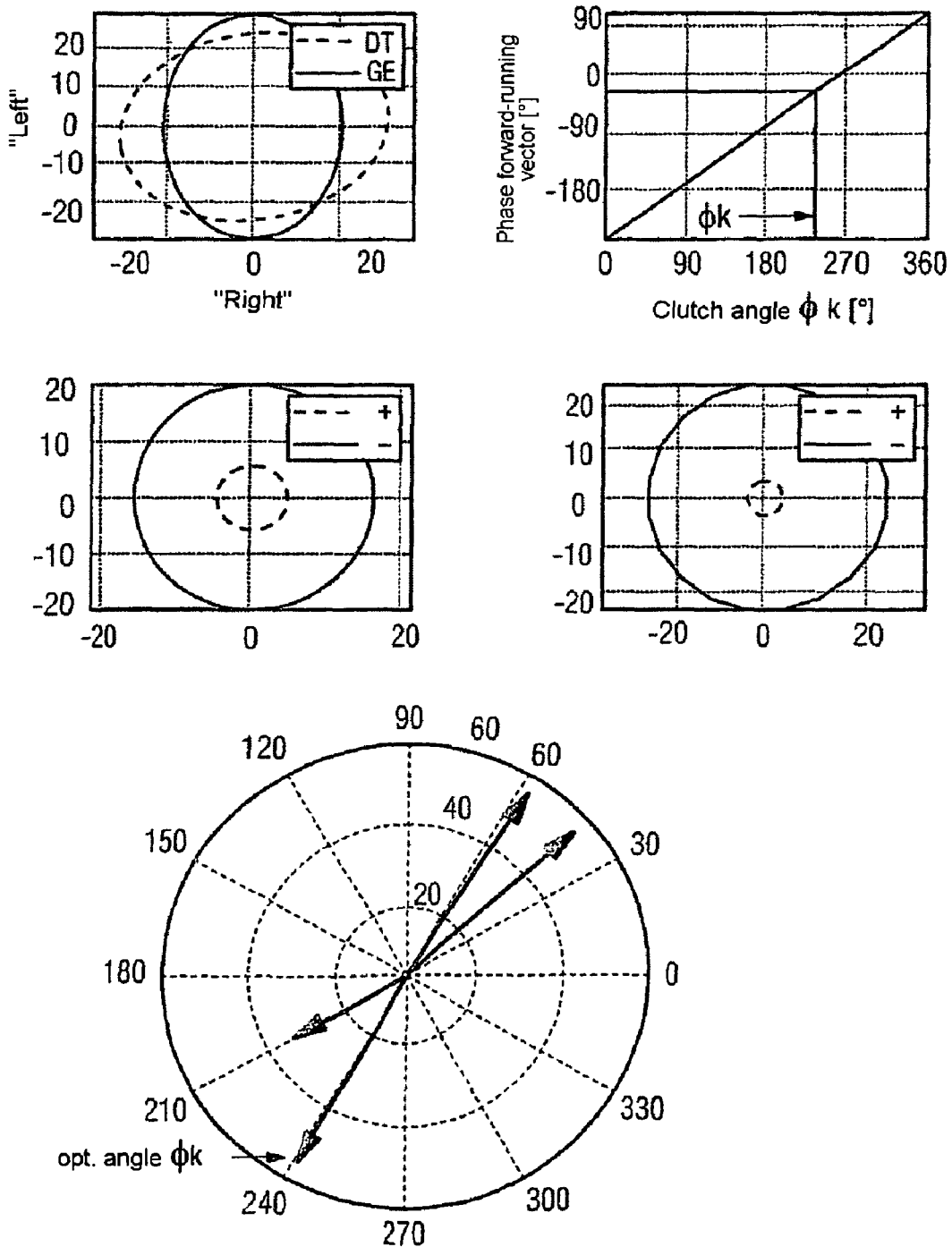

In FIGS. 21 to 23, orbits of the partial shaft trains are in each case shown at the top on the left, the phase difference of the forward-running vector is shown at the top on the right, the forward-running component and backward-running component of the steam turbine are shown at the center on the left, the forward-running component and the backward-running component of the generator are shown at the center on the right, and a clutch chart is shown at the bottom.

The center of gravity S of the shaft, which should be as opposite as possible for the two shaft trains, moves at the synchronous angular frequency $\phi$ in the rotation direction about the point W at which the shaft passes through.

This results in equation (9) for the path of S:

$$r_{S,GE} = r_{W,GE} + \epsilon \cdot e^{j(\omega t + 100\ 0)} \quad (9)$$

In this case, $\epsilon$ is the distance from S to W. After substitution of (8), this results in the following equation for $r_{S,GT}$:

$$r_{S,GE} = (\hat{r}_+ + \epsilon \cdot e^{-j \cdot \omega_0}) e^{j \cdot \omega t} + \hat{r}_- \cdot e^{-j \cdot 107\ t} \quad (10)$$

The angle $\phi_0$ is a constant value and is dependent on the damping and angular frequency. As can be seen, only the radius and phase of the forward-running components of the center of gravity and the shaft center point are different, with the backward-running component being the same for both points.

It is also assumed that the forward-running vector is determined by the unbalance, and the backward-running vector represents the anisotropic reaction of the bearings:

$$r_{W,GE} = \underbrace{\hat{r}_+ \cdot e^{j\omega t}}_{\substack{\text{component governed} \\ \text{by the imbalance}}} + \underbrace{\hat{r}_- \cdot e^{-j\omega t}}_{\substack{\text{produced by} \\ \text{anisotropy of the} \\ \text{bearing stiffnesses}}} \quad (11)$$

On the assumption that only the resultant unbalance is dependent on the clutch angle, only the forward-running components of the shaft oscillation are preferably considered in order to find a good angle.

The forward-running components are circular orbits whose amplitude and angular velocity are constant during one revolution. The phase angle could be compared if the rotation speeds of the two shafts are different. Since, according to equation (10), the amplitude of the forward-running component of the center of gravity is also constant, this comparison also advantageously makes it possible to deduce its position.

In order to determine the optimum clutch angle $\phi_K$ (target angle, twist angle), the phase difference must be determined between the forward-running vectors on the steam-turbine side and gas-turbine side. To do this, the steam turbine is operated, for example, at −10 rpm subsynchronously and the gas turbine is operated at the synchronous rotation speed, in the steady state. After processing of the oscillation measurements, as described above, the forward-running vectors are obtained on the basis of magnitude and phase for both partial shaft trains. The relative twist angle $\phi_K$ changes slowly as a result of the small difference in the angular velocity, and therefore also the phase angle of the forward-running vectors. In this case, the angles change at the same rate.

Depending on whether the shafts are operated supercritically, between-critically or subcritically, the phase difference between the shaft trains must be 0° or 180° in order that the centers of gravity are as opposite as possible, so that their effects compensate from one another. At this time, the twist angle actually corresponds to the good engagement angle. This must be stored by an appropriate automation appliance, and must be used as the target angle by the closed-loop control system.

Figures 24, 25:
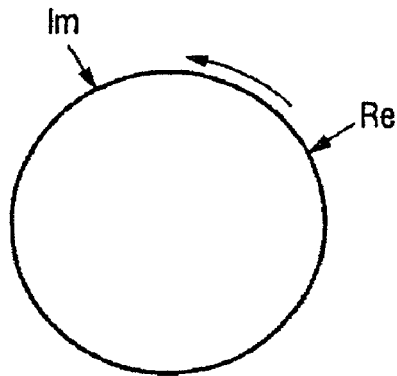

FIG. 25 (phase angle of the forward-running vector with a good engagement angle) shows the phase difference between the forward-running vectors for which a good engagement angle results on the basis of the theoretical principles.

The respective trial installation can be classified in the table (FIG. 25) on the basis of the breakdown of the orbits into forward-running and backward-running components. Shaft trains in between-critical operation have opposite orbits. This is the case when the magnitude of the backward-running component is greater than that of the forward-running component. This analysis has been carried out using the measurement data of the three trial installations as can be seen in FIG. 25.

For comparison, measurements are available in three different installations, with the shaft oscillations processed here having been determined during transient rotation-speed operation.

FIG. 21 shows the steps for determination of the good engagement angle using the example of the gas and steam trial installation 2. The orbits of the two partial shaft trains are illustrated at the top on the left in the figure. The figures on the second line show the breakdown with the forward-running and backward-running components. At the top on the right, the figure shows the phase difference between the forward-running vectors with respect to the clutch angle $\phi_K$. This is based on the assumption that both shafts are being operated supercritically, that is to say the phase difference between the forward-running vectors must actually be 180°, for the engagement angle $\phi_K$ to be good. This part of FIG. 21 also shows that the phases of the forward-running vectors change just as quickly as the engagement angle $\phi_K$.

A clutch chart with three measured shaft oscillations is illustrated at the bottom of the figure. The length of the vectors corresponds to the oscillations after all the transient processes have decayed, with the angle at which they are plotted corresponding to the measured engagement angle. The determined optimum engagement angle $\phi_K$ is shown as an additional vector. The position of this vector is not important and has been chosen roughly just for illustrative purposes. The determined angle is obviously in the region of small oscillations on the clutch chart.

FIG. 22 shows the results for a trial installation 3. In this case, the gas turbine is being operated between-critically (backward-running vector greater than the forward-running vector) and the steam turbine is being operated supercritically. In this case, the engagement angle was determined for a phase difference of 0°. The clutch chart shows that this engagement angle $\phi_K$ is also in the good range.

In the case of the trial installation 1 (FIG. 23), the backward-running vectors are greater than the forward-running vectors for both partial shaft trains, thus indicating between-critical operation. The optimum engagement angle then occurs at a phase difference of 180°. More measurement data were available for this installation, as can be seen in the clutch chart. In this case as well, the good engagement angle occurs with the relatively small oscillations.

A steady rotation speed of preferably −10 rpm is advantageously introduced, from which a predetermined target angle can be achieved, with any desired rotation-speed transient. The difference $\Delta_\phi$ between the start angle and the target angle or engagement angle is constant with respect to the engagement angle $\phi_K$ on an installation-specific basis, and can therefore be measured during commissioning.

In the prior art, the signal KUPE which indicates the engaged state is set too early. It is proposed that the method according to the invention be used to set the signal closer to the actual engagement process.

Pulsed signals which each produce one signal per revolution in order to determine the rotation speed are a direct measure for determination of the relative twist of the input drive (steam-turbine side) and output drive (generator side). In the prior art, this angle (engagement angle or relative twist angle $\phi_K$) is purely random, and can assume all values, depending on the number of latching teeth.

A good engagement state exists for steady-state operation when the centers of gravity of the partial shaft trains are opposite with respect to the shaft center point, and their effects thus partially compensate for one another. Good engagement angles can be determined when the gas turbine is in rated operation and the steam turbine is at the steady rotation speed. The shaft oscillations determined at the measurement points close to the SSS clutch are broken down using complex-calculation methods into the forward-running and backward-running component. A comparison of the phase angles of the two forward-running vectors provides a conclusion about good engagement angles. In this case, the rated rotation speed of the shaft with respect to the critical rotation speeds should be taken into account.

When a clutch chart is available for existing installations, the angle can be adopted directly as the target angle in the closed-loop control system.

The invention claimed is:

1. A method for clutch engagement of an input drive shaft of a continuous flow machine to an output drive shaft using a clutch, comprising:

accelerating the continuous flow machine to a rotation speed which is subsynchronous with respect to the output drive shaft and is held at a steady rotation speed before a signal is set which starts a clutch engagement process; and setting the signal when a phase difference between two partial shaft trains is such that both centers of gravity are opposite.

2. The method as claimed in claim 1, wherein the steady rotation speed has a magnitude of −10 rpm with respect to the output drive shaft.

3. The method as claimed in claim 2, wherein a relative twist angle between the two partial shaft trains is determined.

4. The method as claimed in claim 3, wherein the relative twist angle is stored in an automation appliance, and is used by a closed-loop control system.

5. The method as claimed in claim 2, wherein the signal is blocked, in such a way that a plurality of shaft oscillations is determined and compared in a disengaged state of the two partial shaft trains.

6. The method as claimed claim 2, wherein two oscillation measurements are performed for each of the two partial shaft trains.

7. The method as claimed in claim 2, wherein one pulsed signal is determined per revolution for each of the two partial shaft trains, in order to determine the rotation speed.

8. The method as claimed in claim 2, wherein the phase difference is determined using a plurality of forward-running vectors of the input drive shaft and of the output drive shaft.

* * * * *